(No Model.)   3 Sheets—Sheet 1.
M. C. CLARK.
MACHINE FOR WASHING AND SHEETING CRUDE RUBBER.
No. 535,789.  Patented Mar. 12, 1895.
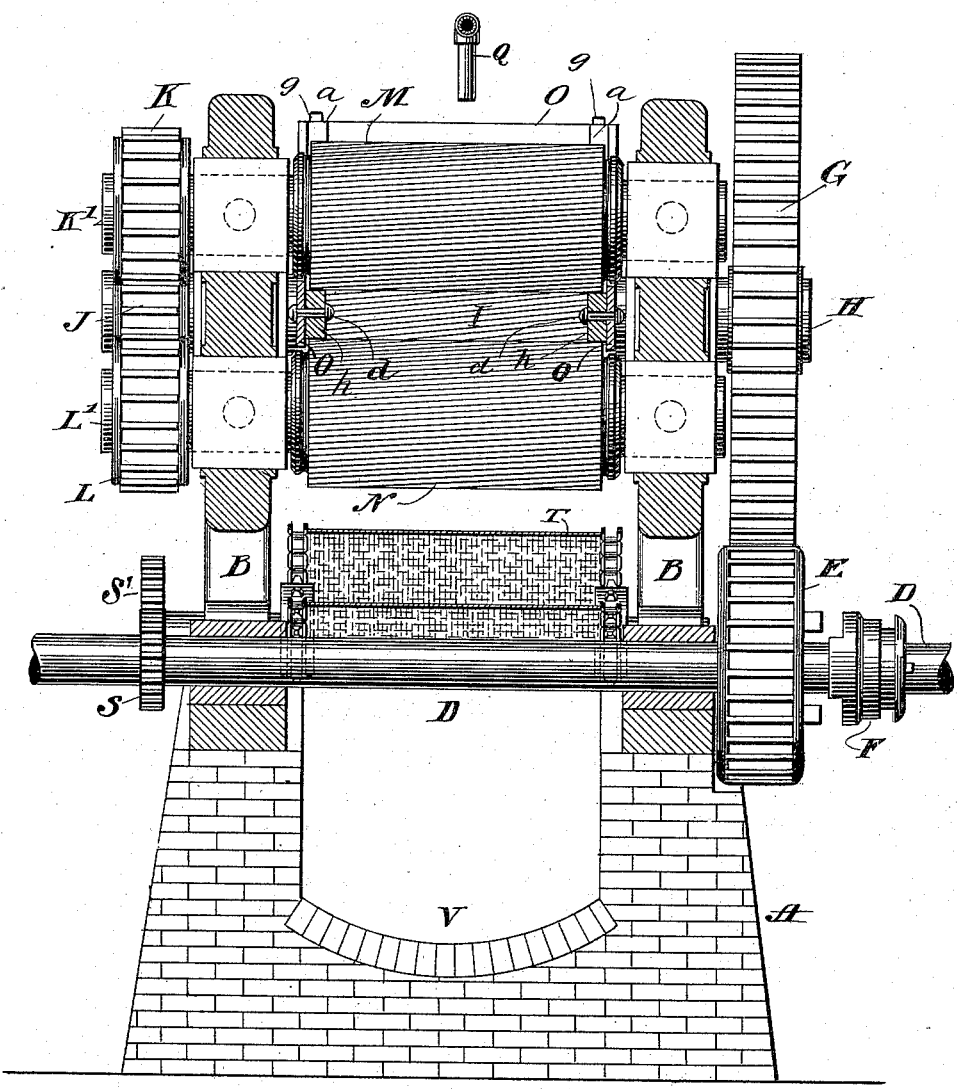
WITNESSES:
Frank S. Ober
J. R. Stagg
INVENTOR
Maurice C. Clark.
BY
R. C. Mitchell
ATTORNEY (No Model.)   3 Sheets—Sheet 2.
M. C. CLARK.
MACHINE FOR WASHING AND SHEETING CRUDE RUBBER.
No. 535,789.   Patented Mar. 12, 1895.
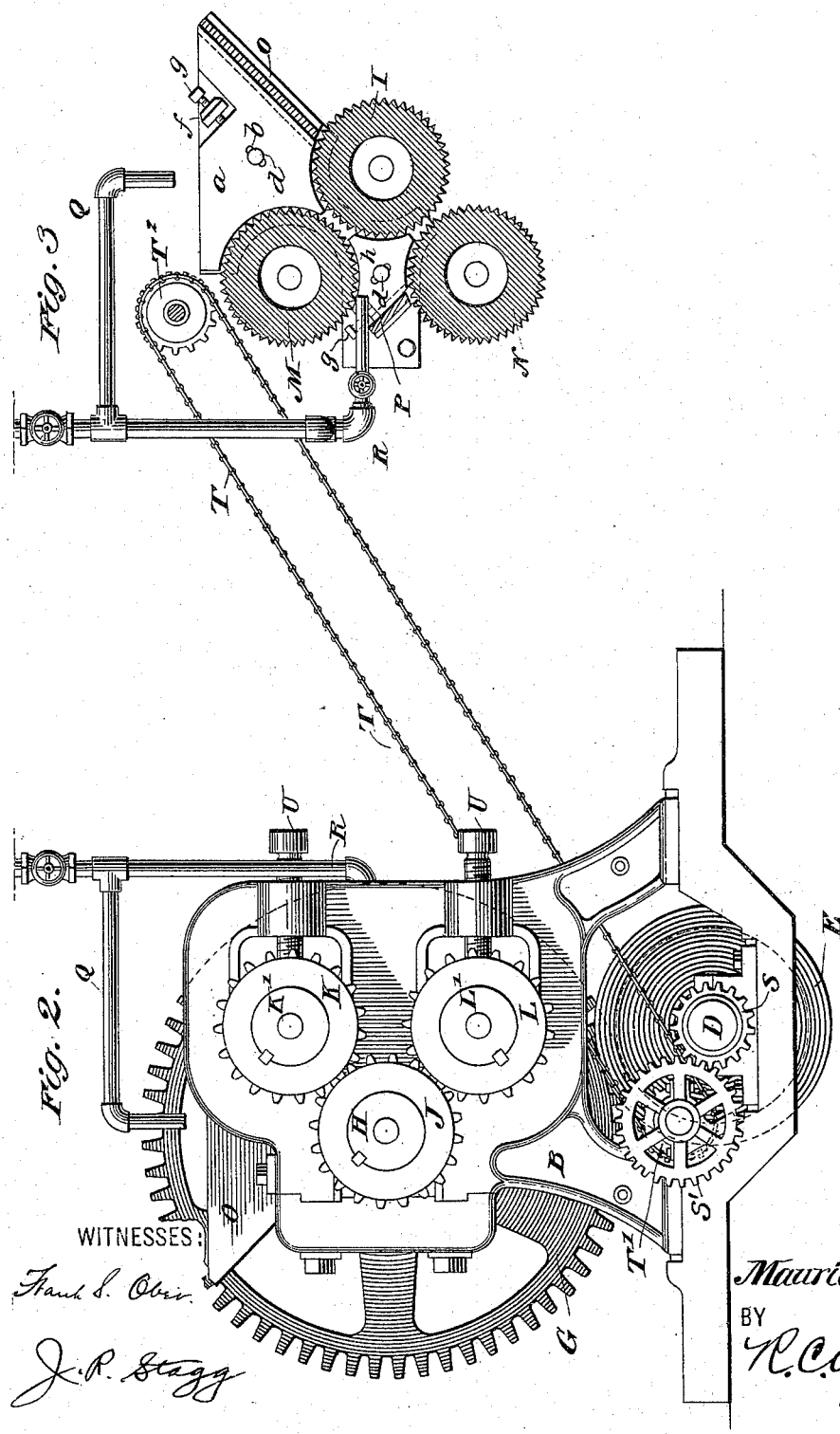
WITNESSES:
Frank S. Obir
J. R. Stagg
INVENTOR
Maurice C. Clark.
BY
R. C. Mitchell
ATTORNEY (No Model.) 3 Sheets—Sheet 3.
M. C. CLARK.
MACHINE FOR WASHING AND SHEETING CRUDE RUBBER.
No. 535,789. Patented Mar. 12, 1895.
Fig. 4.
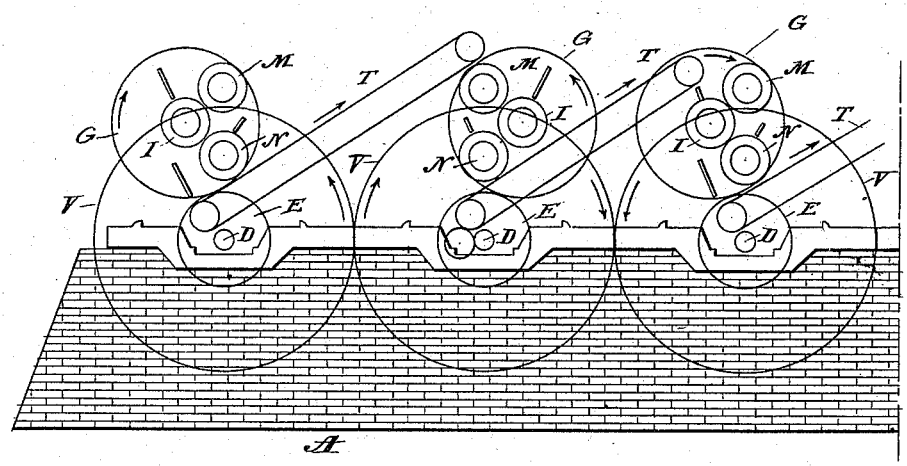
Fig. 5.
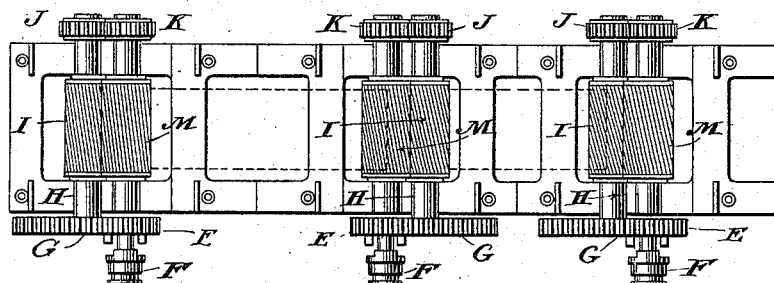
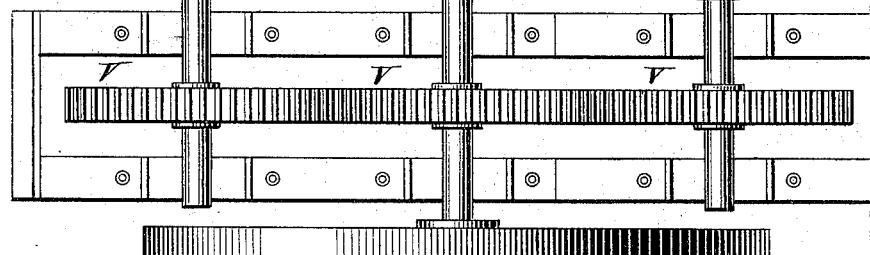
WITNESSES:
Frank S. Ober
J. R. Stagg
INVENTOR
Maurice C. Clark.
BY
R. C. Mitchell,
ATTORNEY

UNITED STATES PATENT OFFICE.

MAURICE C. CLARK, OF MILLVILLE, MASSACHUSETTS.

MACHINE FOR WASHING AND SHEETING CRUDE RUBBER.

SPECIFICATION forming part of Letters Patent No. 535,789, dated March 12, 1895.

Application filed November 12, 1894. Serial No. 528,498. (No model.)

*To all whom it may concern:*

Be it known that I, MAURICE C. CLARK, a citizen of the United States, residing at Millville, in the township of Blackstone, in the county of Worcester, in the State of Massachusetts, have invented a new and useful Improvement in Machines for Washing and Sheeting Crude Rubber, of which the following is a specification.

My invention relates to an improved apparatus and process for washing and sheeting crude rubber, or caoutchouc.

Heretofore, crude rubber has been washed and sheeted by the use of two corrugated rolls, set horizontally, and parallel with each other. Between these rolls the operator passed the rubber in its crude state, repeating the operation until the rubber was reduced to a sheet of the proper thickness. This method was necessarily slow and imperfect.

By the use of my new machine the finished product is more thoroughly cleansed, and more perfectly sheeted, and moreover, the automatic operation of the machine increases the capacity of the plant. So that, in summing up, it may be said that the objects of my invention are simplicity of operation; economy of labor; and uniformity of the finished product.

My invention is illustrated in the accompanying drawings, in which—

Figure 1. is a part sectional end elevation of my mechanism mounted on a suitable base. Fig. 2. is a side elevation of the same machine. Fig. 3. is a longitudinal section through the machine showing merely the arrangement of the sheeting and washing apparatus. Fig. 4 is a diagrammatic illustration of the machines set in series, the arrows thereon indicating the direction of rotation of the parts. Fig. 5 is a plan view of the machines illustrated in Fig. 4.

Similar letters refer to similar parts throughout the several figures.

A is a suitable base upon which the mechanism rests. B is a frame supported on said base.

D is a revoluble shaft communicating with the power wheels. Loosely mounted on said shaft is a gear wheel E, a suitable clutch mechanism F being provided to throw said gear wheel E into or out of operation. A gear wheel G meshing with the gear wheel E is carried by a shaft H, which shaft is supported in the frame A. Fixedly mounted on this shaft H or integrally formed therewith, is a roll I, the surface of which is by preference corrugated, the said corrugations by preference being cut on a suitable pitch. At the opposite end of the shaft H is fixed a gear J, said gear meshing with two corresponding gears K and L fixedly mounted upon shafts K' L' said shafts being adjustably mounted in the frame B so as to partake of lateral adjustment. Fixed upon these shafts K' L', or integrally formed therewith, are rolls M N corrugated to correspond with the roll I.

O is a hopper located above and communicating directly with, the rolls M I.

P is a guide located between the rolls M N for the purpose hereinafter described.

Q is a water supply pipe communicating with the interior of the hopper O. Another water supply pipe R communicates with the space between, and defined by the rolls M, N, I and the guide P.

Fixed upon the shaft D is another gear wheel S which actuates a sprocket roller T', through the medium of a gear S'. The roller T' moves an endless belt or conveyer T supported at its upper end by the sprocket roller T² which roller is located above the hopper O of the next adjacent machine.

In operation it will be seen that the crude rubber or caoutchouc is first placed in the hopper O, and drawn therefrom by and between the rolls M I, then directed by the guide P between the rolls N I, through which it is drawn and from which it is delivered to the conveyer T, which carries it to the hopper O of the next adjacent machine through which it passes in the same manner.

To prevent the rubber from spreading beyond the ends of the rolls M I N, I provide adjustable side walls *a a* in the hoppers, which side walls bear closely against the rolls M I and which occupy substantially the whole of each side of the hopper O.

*h h* are adjustable side walls in front of the guide P and bearing against rolls N I.

*b b* are elongated slots or perforations in the side walls. Projecting through these perforations *b*, and fixed to the immovable side walls of the hopper O, are the guide bolts *d d*.

$ff$ are lugs or shoulders projecting inwardly from the stationary sides of the hopper O. These shoulders $ff$, carry the set-screws $g\ g$, the lower ends of which bear against the adjustable side walls $a\ h$, as shown, to facilitate the adjustment of the same against the rolls.

The rolls M N as above suggested are adjustably carried in the frame B so that the distance between said rolls and the roll I may be varied according to the need, this adjustability being secured through the medium of suitable adjusting screws U U. By preference the roll I is mounted outside of a direct line between the rolls M N, the advantage of this arrangement being that in the lateral adjustment of the rolls M N, the distance between said rolls and the roll I may be more perfectly adjusted, and furthermore the rubber feeds through the machine more readily.

The advantage of locating the rolls three or more in each machine, resides particularly in the fact that each side of the rubber during the process of sheeting is entirely exposed to a thorough washing, and furthermore it obviates the necessity of passing and re-passing the rubber through a single pair of rolls many times to reduce it to the proper thickness or condition. By this means long continuous strips or sheets of rubber may be formed and the thickness determined by the space between the series of rolls, which space is gradually reduced toward the end of the process.

The water which has been fouled during the process of cleaning, passes through the bottom of the machine into a suitable trough or conduit V formed in the base or support A.

Instead of employing belt connections between the various machines, I couple them together by a system of gearing, V V V.

It is obvious that to employ three or more rolls in a machine together with the hoppers, adjustable guides and conveyers as described, would be within the scope of my invention.

Having thus described my invention, what I claim, and desire to secure by Letters Patent, is—

1. In a machine for washing and sheeting crude rubber, the combination of the revoluble roll I the adjustable rolls parallel thereto and located to one side thereof, with the hopper O and the guide P and with the driving and washing mechanism, substantially as described.

2. In a machine for washing and sheeting crude rubber, the revoluble roll I mounted in fixed bearings in the frame A, the corresponding parallel rolls M N adjustably mounted in the frame to one side of the roll I, in combination with the hopper O carrying the adjustable side walls $a\ a$, and with the guide P and the adjustable side walls $h$, and the driving and washing mechanism, substantially as described.

3. In a machine for washing and sheeting crude rubber, the combination of the roll I the adjustable rolls M N, the hopper O carrying the adjustable side walls $a\ a$ moving on guide bolts $d\ d$, and the adjusting screws $b$ carried in the shoulders $f$ projecting inwardly from the fixed side walls of the hopper O, with the guide P, the adjustable side walls $h$ moving on guide bolts $d$ and adjusted by screws $g$, with the washing and sheeting mechanism, substantially as described.

4. In a machine for washing and sheeting crude rubber, the feed-hopper provided with supplemental adjustable side walls, rolls M I N, guide P, and with supplemental adjustable side walls $h\ h$ with the conveyer T and the driving and washing mechanism substantially as described.

5. In a machine for washing and sheeting crude rubber the rolls as described, the feed hopper O, the guide P, the supplemental adjustable side walls, $a\ a\ h\ h$ the lower edges of each of which bear against the adjacent rolls to prevent the rubber from spreading beyond the ends of said rolls during the process, and with the driving and washing mechanism, substantially as described.

6. In a machine for washing and sheeting crude rubber, the corrugated rolls as described, the feed-hopper O, the guide P, the supplemental adjustable side walls $a\ a\ h\ h$ the lower edges of which bear against the rolls adjacent thereto to prevent the rubber from spreading beyond the end of the roll, with the conveyer T mounted on sprocket rollers $T'\ T^2$ and a connecting adjacent series of rolls as described, with the driving and washing mechanism, substantially as specified.

MAURICE C. CLARK.

Witnesses:
WALTER R. WILLIAMS,
EDW. QUINN.